United States Patent
Laughlin (10) Patent No.: US 8,074,087 B2
(45) Date of Patent: Dec. 6, 2011

(54) CONFIGURING PROCESSORS AND LOADS FOR POWER MANAGEMENT

(75) Inventor: Chetley T. Laughlin, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 747 days.

(21) Appl. No.: 12/144,709

(22) Filed: Jun. 24, 2008

(65) Prior Publication Data

US 2009/0319812 A1    Dec. 24, 2009

(51) Int. Cl.
G06F 1/00    (2006.01)
G06F 1/26    (2006.01)
G06F 1/32    (2006.01)

(52) U.S. Cl. ........ 713/300; 713/310; 713/320; 713/321; 713/322; 713/323; 713/324; 713/330; 713/340

(58) Field of Classification Search .......... 713/300, 713/310, 320–324, 330, 340
See application file for complete search history.

(56) References Cited

U.S. PATENT DOCUMENTS

| | | | |
|---|---|---|---|
| 5,423,045 A | | 6/1995 | Kannan et al. |
| 5,913,068 A * | | 6/1999 | Matoba ................. 713/322 |
| 5,949,812 A | | 9/1999 | Turney et al. |
| 6,442,700 B1 | | 8/2002 | Cooper |
| 6,449,575 B2 * | | 9/2002 | Bausch et al. ........... 702/107 |
| 6,668,330 B1 | | 12/2003 | Kapil |
| 6,823,516 B1 | | 11/2004 | Cooper |
| 6,845,456 B1 | | 1/2005 | Menezes et al. |
| 7,155,623 B2 | | 12/2006 | Lefurgy et al. |
| 7,464,276 B2 * | | 12/2008 | Rusu et al. ................. 713/300 |
| 7,577,860 B2 * | | 8/2009 | Carpenter et al. ........... 713/320 |
| 7,647,513 B2 * | | 1/2010 | Tobias et al. ............... 713/300 |
| 7,725,747 B2 * | | 5/2010 | Zimmer et al. ............ 713/322 |
| 2006/0036878 A1 * | | 2/2006 | Rothman et al. ............ 713/300 |
| 2007/0288728 A1 | | 12/2007 | Tene et al. |
| 2008/0005381 A1 | | 1/2008 | Theocharous et al. |

OTHER PUBLICATIONS

Childers, et al., "Adapting Processor Supply Voltage to Instruction-Level Parallelism", Appeared in Koolchips Workshop, during MICRO-33, Monterey, California, Dec. 2001, 4 Pages.

Hong, et al., "Power Optimization of Variable-Voltage Core-Based Systems", IEEE Transactions on Computer-Aided Design of Integrated Circuits and Systems, vol. 18, No. 12, Dec. 1999, pp. 1702-1714.

Hsu, et al., "The Design, Implementation, and Evaluation of a Compiler Algorithm for CPU Energy Reduction", Proceedings of the ACM SIGPLAN 2003 conference on Programming language design and implementation, Date: Jun. 9-11, 2003, pp. 38-48, Publisher: ACM New York, NY, USA.

"Processor Power Management in Windows Vista and Windows Server 2008", Date: Nov. 20, 2007, 49 Pages.

* cited by examiner

*Primary Examiner* — M Elamin (57) ABSTRACT

Controlling processors and processor hardware components in a computing device based on execution load and a power saving preference. The power saving preference relates to responsiveness of the processors versus power consumption of the processors to manage battery life of the device. The processors and processor hardware components may be powered on and off based on a determined execution load for the processors and based on the power saving preference. For example, arithmetic logic units, caches, vectorization units, and units for graphics or multimedia support may be individually enabled or disabled based on the execution load and the power saving preference.

20 Claims, 7 Drawing Sheets

CONFIGURING PROCESSORS AND LOADS FOR POWER MANAGEMENT

BACKGROUND

Some existing operating system schedulers are designed to maximize processor performance. The schedulers spread an execution load across all processors in a multiprocessor system to maximize performance. The processors are always held at a maximum clock frequency by the operating system. The scheduler algorithms do not change the quantity of processors powered or the clock frequency.

On some existing laptop and desktop systems with power saving features, a component of the operating system other than the scheduler will sometimes move the processors into lower clock frequency states if the system is determined to be not in use by the user. This is typically done by detecting if the user is using the mouse or keyboard. However, this detection does not indicate whether the system is under low execution load. For example, a background process might be performing calculations long after the user walked away from the system. Changing the processor clock frequency in this example will lead to undesirable situations (e.g., the system slows down or powers off completely instead of completing the work).

Other existing systems allow the user to choose a setting on a graduated scale that has battery life on one end and speed on the other. The existing systems determine when to turn off peripherals based on the setting and after determining that the user is not interacting with the device.

SUMMARY

Embodiments of the invention intelligently and dynamically power processor hardware based on a power setting when scheduling execution loads. An execution load is determined for a computing device having a plurality of processors. The determined execution load is compared to threshold values based on the power setting. At least one operating characteristic of the processors is adjusted based on the comparison. For example, additional processors are powered on, or additional processor hardware components are enabled.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
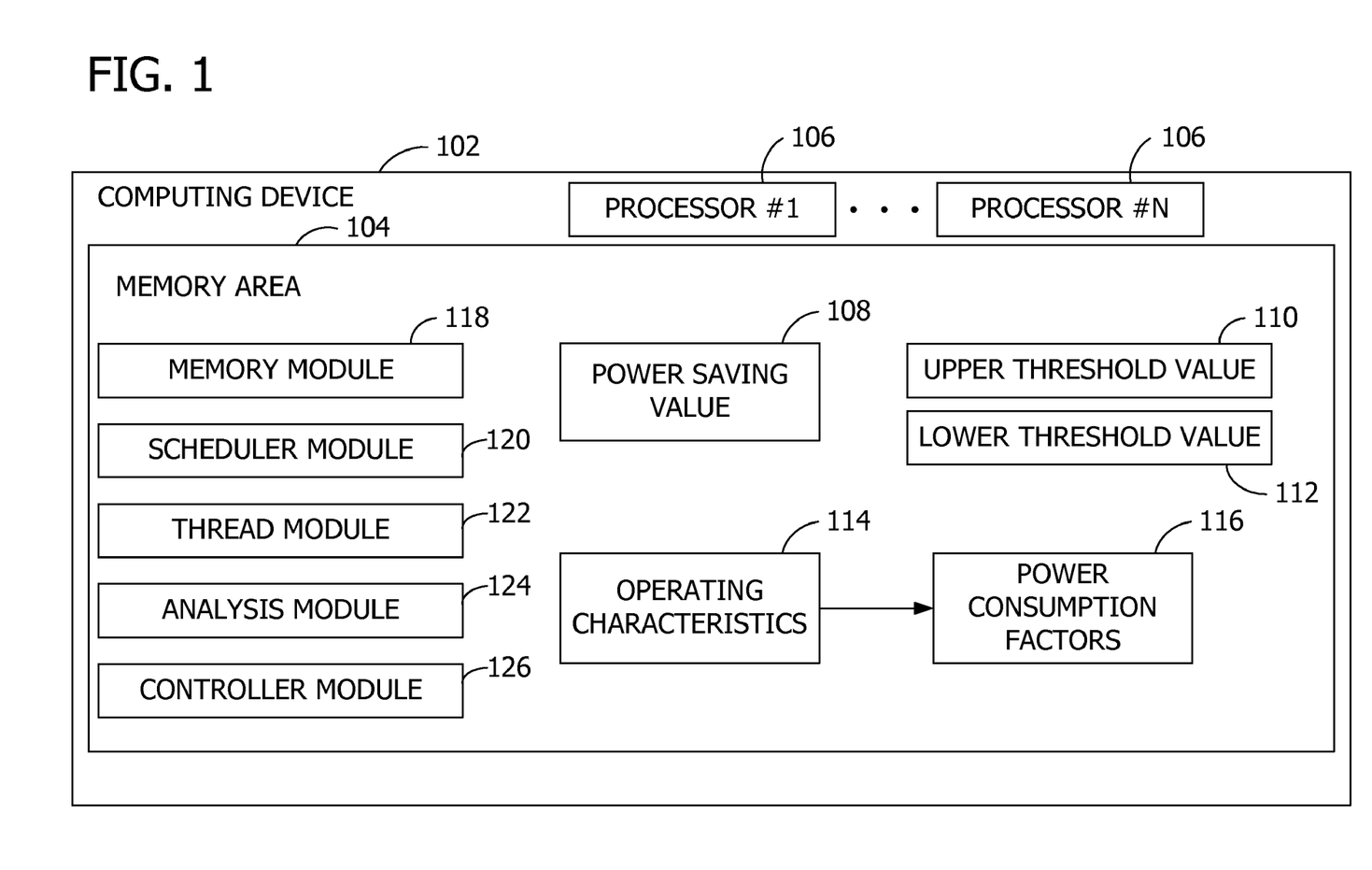
FIG. 1 is an exemplary block diagram illustrating a computing device having one or more processors configured to execute computer-executable modules for managing power consumption of the computing device.

Embodiments of the invention provide a power saving value 108 enabling the dynamic configuration of processors 106 and hardware components of the processors 106 such as shown in FIG. 1. The power saving value 108 reflects a preference for responsiveness or performance versus power consumption of the processors 106 to manage battery life of a computing device 102. The processors 106 and associated hardware components are powered on or off based on the power saving value 108. By enabling a user to balance battery duration and responsiveness of the computing device 102, the power saving value 108 empowers users to finely tune the computing device experience. Further, reducing the quantity of powered hardware components in the computing device 102 reduces the frequency that a cooling fan will become active, thus further reducing power consumption.

In some embodiments, a scheduler 202 in the operating system dynamically determines a quantity of the processors 106 to power and adjusts operating characteristics 114 of the processors 106 based on an execution load 210. For example, the scheduler 202 determines what processors 106 and associated hardware to power and at which clock frequencies to achieve the desired battery life. Battery life for multiprocessor systems may be maximized by turning off one or more processors 106 to fully load the remaining powered processors 106. Alternatively, the scheduler 202 may decide to over commit the currently powered processors 106 rather than power an additional processor 106 by considering the cost of powering the additional processor 106 (e.g., wattage). In some embodiments, the clock frequency of the processors 106 may be changed asymmetrically to minimize power draw for a particular execution load 210. For example, each processor 106 may be set to a different clock frequency.

Referring again to FIG. 1, an exemplary block diagram illustrates the computing device 102 having the processors 106 configured to execute computer-executable modules for managing power consumption. The computing device 102 includes a memory area 104 and the processors 106 such as processor #1 through processor #N, wherein N is a positive integer value. The memory area 104, or other computer-readable medium, stores the power saving value 108. Generally, the power saving value 108 indicates how aggressive the scheduler 202 operates to extend battery life while scheduling tasks. In some embodiments, the power saving value 108 provides a graduated scale, preference, or range between fast response but poor battery duration, and slower responsiveness but extremely long battery life. For example, when the power saving value 108 or other equivalent variable value is at the low end of the range, battery life is paramount while processor speed is of low concern. When the power saving value 108 is at the high end of the range, responsiveness is of more concern while battery life is of little concern.

The power saving value 108 is input, for example, by an application program developer, a user of the computing device 102, or an original equipment manufacturer (OEM). Depending on the computing device 102, the power saving value 108 or set of values may be generated in several ways. For example, the power saving value 108 may be input via a user interface, or decoded from a protected area of the computing device 102. In a user interface example, the user is presented with a screen dialog that allows the user to pick the setting using a slider. The dialog saves the selected power saving value 108 in a memory location that is readable by the scheduler 202. Alternatively, some OEMs may wish to set the power saving value 108 to optimize the computing device experience or simplify the user interface, and not allow the user to change the setting. In such cases, the OEM may store the power saving value 108 as configuration information in a data store controlled by the OEM (e.g., in a file or registry). The power saving value 108 is readable by the scheduler 202.

In an embodiment, the processor 106 is transformed into a special purpose microprocessor by executing computer-executable instructions or by otherwise being programmed. For example, the memory area 104 stores computer-executable modules for balancing power consumption of the plurality of processors 106 with responsiveness of the processors 106 of the computing device 102. Exemplary modules include a memory module, a scheduler module, a thread module, an analysis module, and a controller module. The memory module accesses an upper threshold value 110 and a lower threshold value 112 associated with the computing device 102 and stored in the memory area 104. The upper threshold value 110 and the lower threshold value 112 represent preferences relating to responsiveness of the processors 106 versus power consumption of the processors 106.

In the example of FIG. 1, the scheduler module distributes the execution load 210 among the processors 106 such that all but one of the processors 106 is fully loaded. The one processor 106 is partially loaded. The execution load 210 on the processors 106 reflects the total amount of threads in an active queue waiting to be assigned by the scheduler 202 for execution. In some embodiments, the execution load 210 is calculated as the anticipated number of active threads needing execution in the near future. For example, a media player reserves processor time with a reservation system. Such reservations increase the anticipated load that the scheduler 202 calculates as the execution load 210 on the processors 106. The scheduler 202 evaluates, anticipates, and handles the processor execution loads 210 by committing, undercommitting, or overcommitting the processors 106.

The thread module determines the partial load on the partially loaded processor. For example, the thread module operates with the scheduler 202 to measure a quantity of active threads assigned to execute on the partially loaded processor, or otherwise measures demand for thread execution for the processor 106. The analysis module compares the determined partial load to the accessed upper threshold value 110 and to the accessed lower threshold value 112. The controller module adjusts at least one operating characteristic 114 of the partially loaded processor based on the comparison. For example, the controller module adjusts the operating characteristic 114 by adjusting a clock frequency of the partially loaded processor such that the partially loaded processor provides responsiveness substantially equivalent to responsiveness of the other processors 106. As another example, the controller module adjusts the operating characteristic 114 of the partially loaded processor by disabling the partially loaded processor and distributing the partial load among the other processors 106. In yet another example, the controller module adjusts one or more of the following hardware elements associated with the partially loaded processor: an arithmetic logic unit (ALU), a cache, a vectorization unit, and a specialized unit for graphics or multimedia support.

The execution load 210 on the processors 106 typically varies over time. While a portion of the execution load 210 is predicable under some conditions, there is significant randomness or variance in the execution load 210. In some embodiments, the randomness may include large swings between light and heavy execution loads 210. The swings in execution load 210 cause the hardware components to cycle rapidly between power states if the scheduler 202 reacts to the swings in execution load 210. The rapid cycling is further exacerbated if the hardware components have a significant ramp up or ramp down time.

To account for workload variance, some embodiments of the invention include a function that allows the power state to change only at a measured rate over time to dampen the cycling between power states. Other embodiments forecast or anticipate the rate or set the rate explicitly. In systems supporting reserved work units (e.g., applications or processes that know future workload), the scheduler 202 uses the reserved work units to adjust the power states.

The memory area 104 also stores a correspondence between the hardware components associated with the processors 106 and power consumption factors 116. The power consumption factors 116 represent a cost associated with using each of the hardware components. In some embodiments, the cost is measured in wattage or watt/hours as it affects battery life for the computing device 102. The scheduler 202 consults the correspondence between hardware components and the power consumption factors 116 when selecting operating characteristics 114 of the processors 106 to adjust (see FIG. 3).

Figure 2:
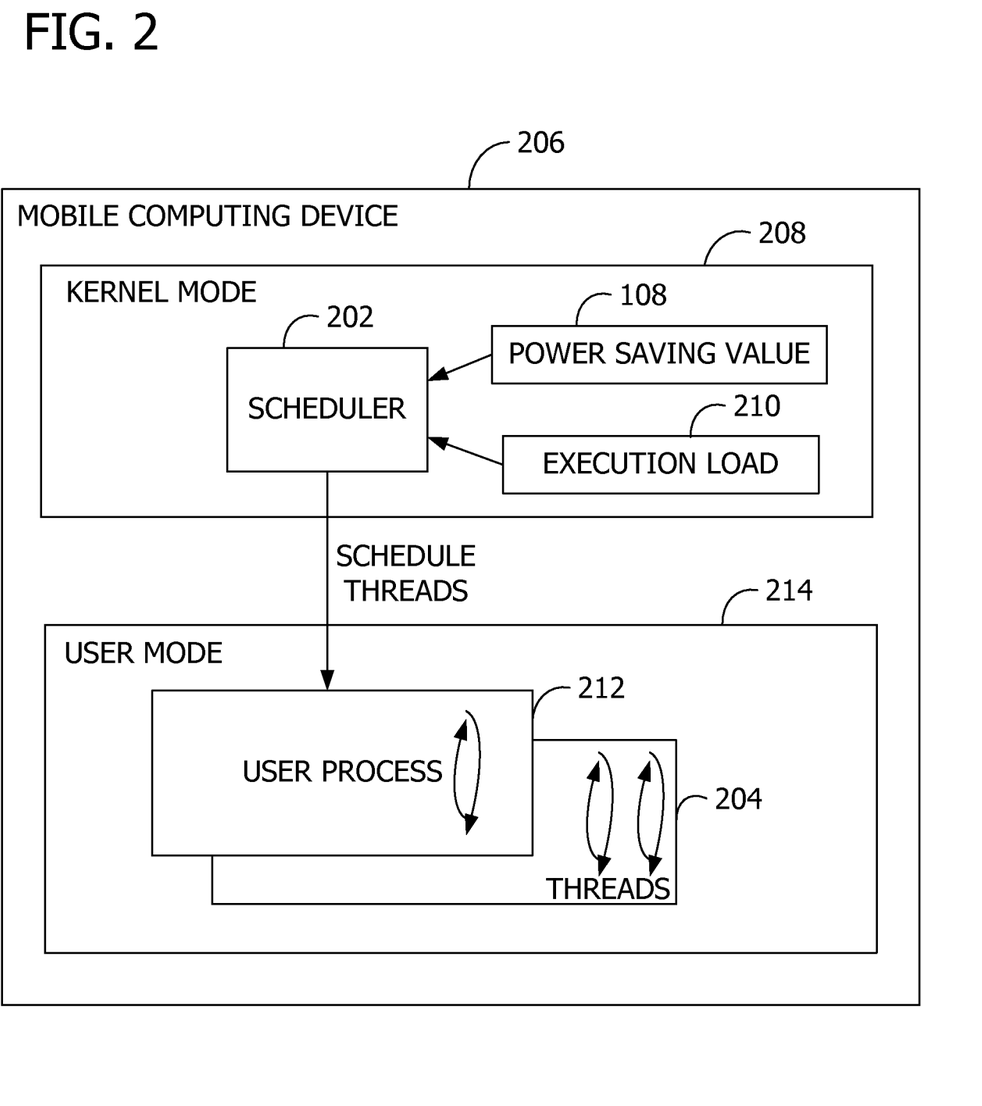
FIG. 2 is an exemplary block diagram illustrating a kernel scheduler managing user-mode threads on a mobile computing device.

Referring next to FIG. 2, an exemplary block diagram illustrates the scheduler 202 managing user-mode threads 204 on a mobile computing device 206. In the example of FIG. 2, the scheduler 202 operates in kernel mode 208. In other embodiments, the scheduler 202 operates in user mode or a mode other than the kernel mode 208. Based on the power saving value 108 or variable and the execution load 210, the scheduler 202 schedules the threads 204 associated with at least one user process 212 executing in user mode 214 on the mobile computing device 206. The scheduler 202 schedules the threads 204 in accordance with the operations illustrated and described, for example, in the flowcharts of FIGS. 3, 4, 5, 6, and 7 to manage the power consumption of the mobile computing device 206.

While some embodiments of the invention are illustrated and described herein with reference to the mobile computing device 206 or other power constrained portable device such as a laptop, embedded device, telephone, a personal digital assistant, or a gaming console, aspects of the invention are operable with any computing device 102 that performs the functionality illustrated and described herein, or its equivalent. For example, embodiments of the invention are operable with a desktop computing device, a laptop computer, and other portable and non-portable computing devices 102 to reduce the power draw of the device thereby reducing infrastructure power costs, among other benefits.

Further, aspects of the invention are operable with the scheduler 202 shown in FIG. 2. That is, the scheduler 202 performs the operations described and illustrated herein. Aspects of the invention, however, may be implemented outside the scheduler 202 as, for example, a power management service or any logic embodied in hardware or software that provides the illustrated functionality. For example, the logic may be performed by a web service or by special purpose hardware.

Figure 3:
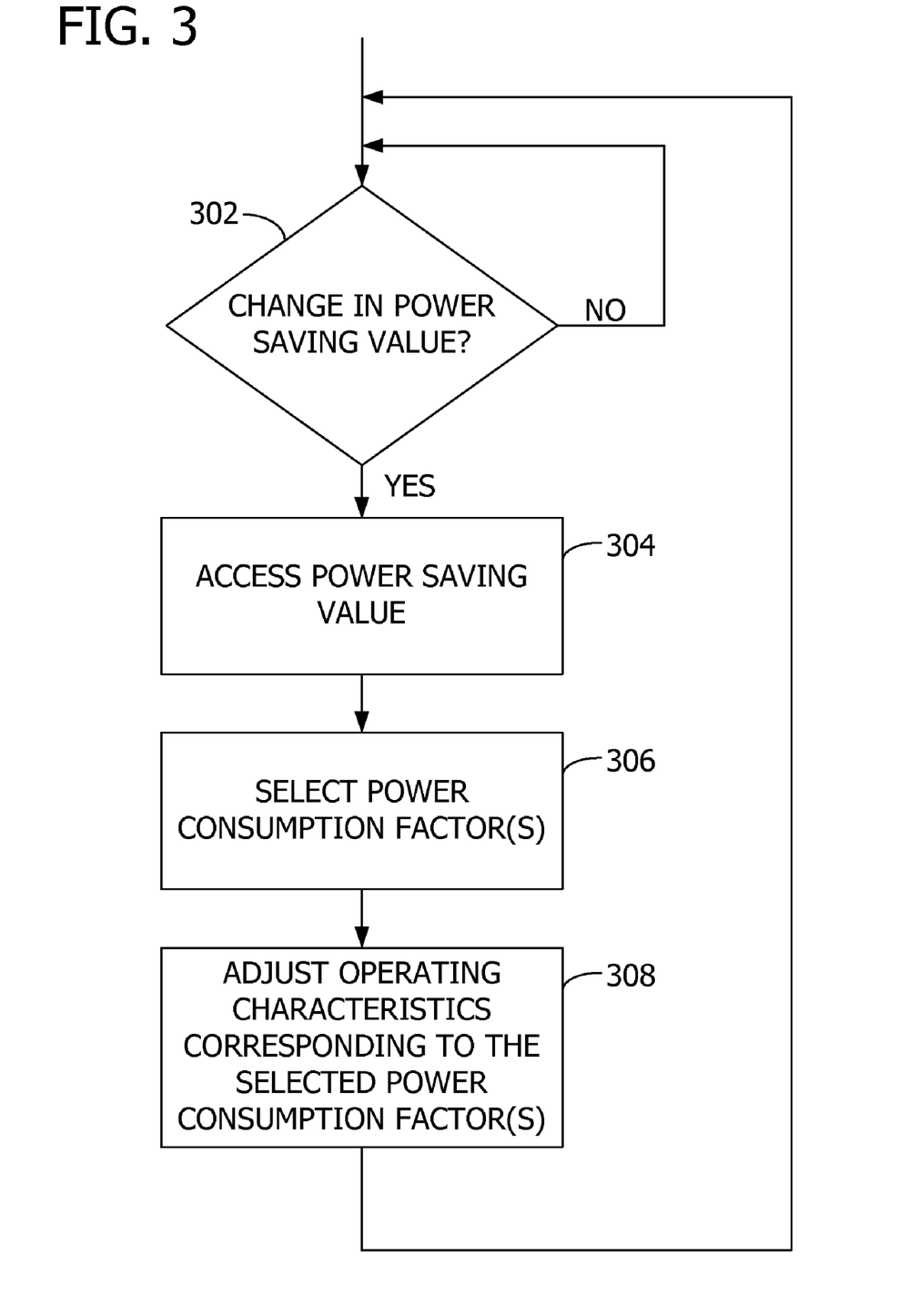
FIG. 3 is an exemplary flow chart illustrating the adjustment of processor hardware based on a power saving value and power consumption factors for the processor hardware on a computing device.

Referring next to FIG. 3, an exemplary flow chart illustrates the adjustment of processor hardware based on the power saving value 108 and power consumption factors 116 for the processor hardware on the computing device 102. In the example of FIG. 3, the scheduler 202 or other logic detects a change in the power saving value 108 at 302. At 304, the power saving value 108 is obtained or otherwise accessed from the memory area 104 responsive to the detected change at 302. One or more of the power consumption factors 116 are selected based on the power saving value 108 at 306. The power consumption factors 116 correspond to a cost associated with operating one of the processors 106 or its hardware components. For example, the scheduler 202 selects the power consumption factors 116 to achieve the battery life indicated by the power saving value 108. The scheduler 202 then adjusts the processor 106 and/or hardware components corresponding to the selected one or more power consumption factors 116 at 308 to manage power consumption in accordance with the power saving value 108.

Figure 4:
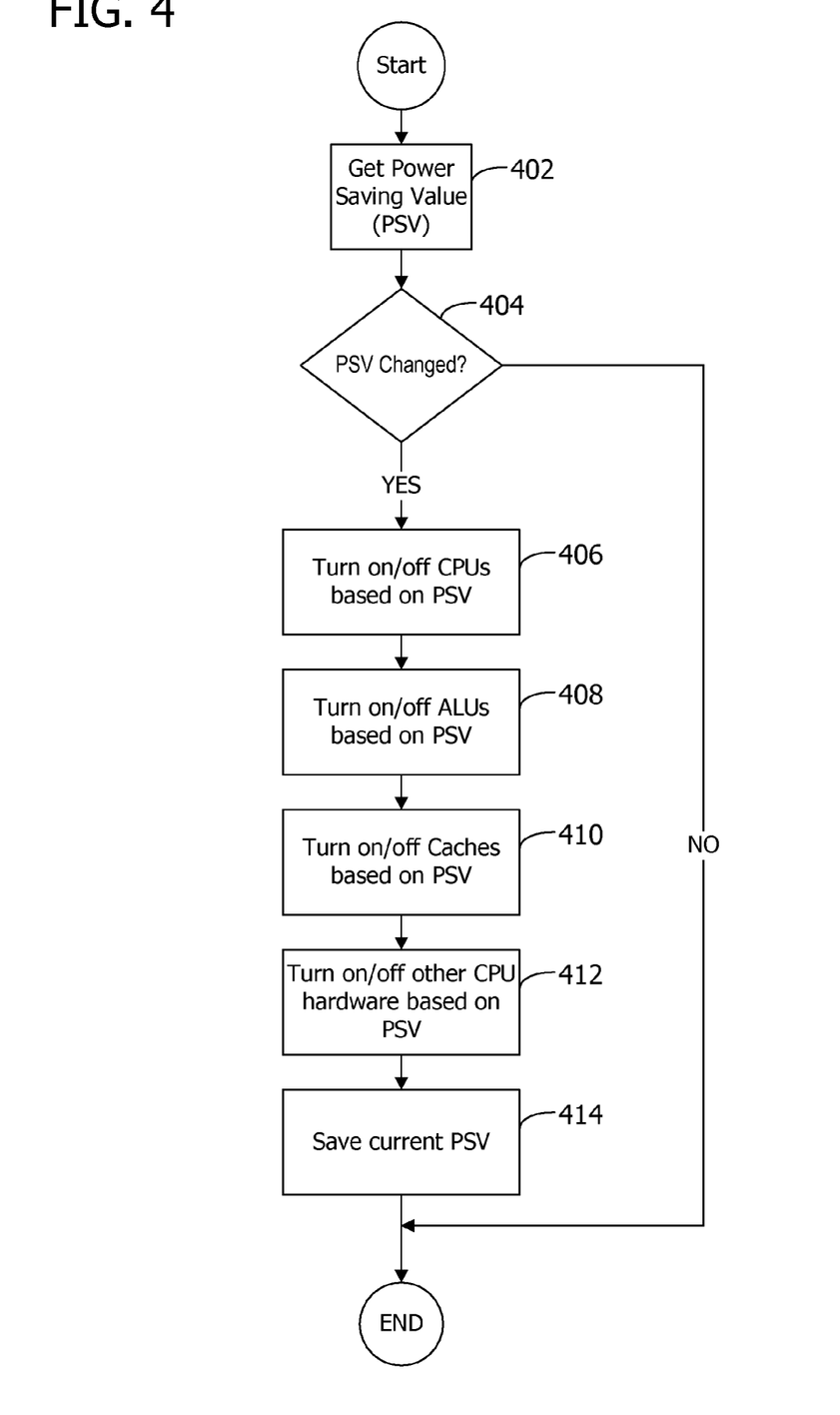
FIG. 4 is an exemplary flow chart illustrating the enabling and disabling of processor hardware based on a preference input as a power saving value.

Referring next to FIG. 4, an exemplary flow chart illustrates the enabling and disabling of processor hardware based on the power saving value 108. In the example of FIG. 4, the processors 106 and associated hardware components are capable of being individually enabled and disabled. This reduces power leakage and improves battery life when the components are not powered.

The power saving value is obtained at 402. If the obtained power saving value is different from a stored power saving value at 404, the scheduler 202 turns on or off the central processing units (CPUs) such as processors 106 at 406, arithmetic logic units (ALUs) at 408, caches at 410, and other CPU hardware at 412. The scheduler 202 saves the new power saving value at 414.

In some embodiments, the scheduler 202 requests one of the processors 106 to power on, but then waits a defined amount of time before assigning any tasks to the newly-powered processor 106. This defined amount of time accounts for delays between the time the request is made and time that the hardware becomes available. Embodiments of the invention account for the delay in powering on one of the processors 106 by increasing the upper threshold at which the request to power on the processor 106 is made.

In an example in which the user has an arbitrary sliding scale from 50 to 100 to control the operating characteristics 114 of the processors 106, the user selects 50 to indicate a preference for slow response but long battery life. The value of 50 becomes the power saving value 108. In this example, the scheduler 202 powers off all but one processor 106 and disables any controllable processor hardware. The remaining processor 106 may have a huge list of threads 204 causing responsiveness to suffer, but the user will experience long battery life.

In another example, the user selects 100 to indicate a preference for a fast response but poor battery life. In this example, the scheduler 202 powers on all available processors 106 and enables all controllable processor hardware. In this example, there are multiple processors 106 to process the list of threads 204, so responsiveness will be great, but the battery will drain faster.

In yet another example, the user selects 75 to indicate a compromise between responsiveness and battery life. In this example, the scheduler 202 powers on about half of the processors 106 and about half of the power consuming processor hardware. For example, the scheduler 202 may power on two out of three processors 106, and enable an L1 cache but not an L2 cache. The result is a balance between responsiveness and power savings.

Appendix A provides an exemplary implementation of the operations illustrated in FIG. 4.

In the example of FIG. 4, the operations controlling the processor 106 and associated hardware components are performed without determining the execution load 210 on the processors 106. In contrast, the operations in FIG. 5 as next described are based on the execution load 210 of the processors 106.

Figure 5:
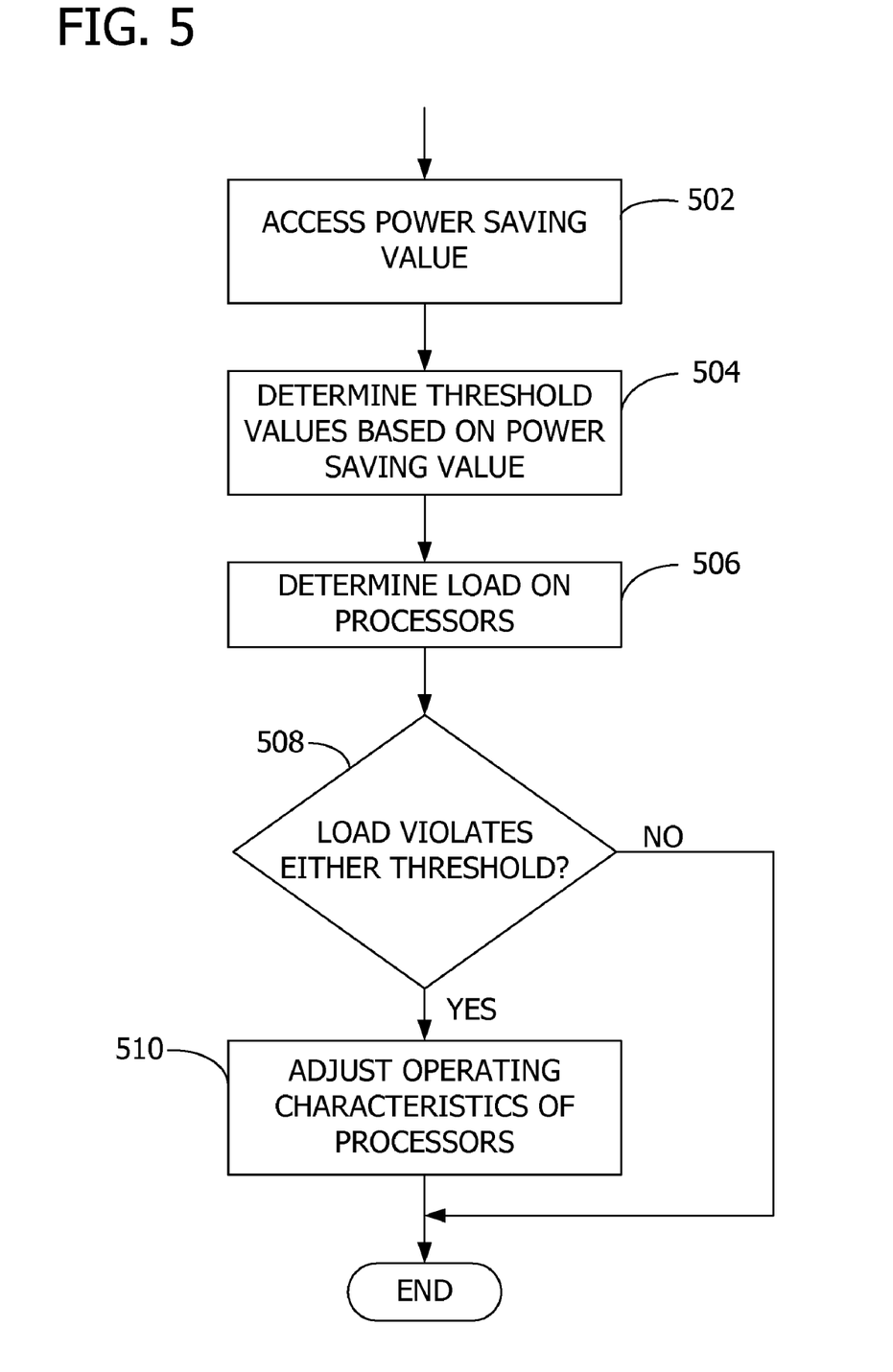
FIG. 5 is an exemplary flow chart illustrating the adjustment of processor hardware based on a comparison between processor execution load and threshold values.

Referring next to FIG. 5, an exemplary flow chart illustrates the adjustment of processor hardware based on a comparison between processor execution load 210 and threshold values. The scheduler 202 responds to changing load conditions by adjusting the processing power based on the power saving value 108. The power saving value 108 is accessed at 502. Based on the accessed power saving value 108, the upper threshold value 110 and the lower threshold value 112 are determined at 504. The upper threshold value 110 and the lower threshold value 112 indicate the levels at which the scheduler 202 or other logic enables and disables the operating characteristics 114 of the processors 106, respectively. In some embodiments, the upper threshold value 110 represents one or more of the following, or the like: a degree of overcommitment or overutilization by the processors 106, a defined maximum power draw by the processors 106, and a defined maximum execution load 210 for the processors 106. Further, the lower threshold value 112 represents one or more of the following, or the like: a degree of undercommitment or underutilization by the processors 106, a defined minimum power draw by the processors 106, and a defined minimum execution load 210 for the processors 106.

At 506, the execution load 210 on the processors 106 is determined. In some embodiments, the determined execution load 210 is distributed substantially equally among the processors 106. At 508, the execution load 210 is compared to the upper threshold value 110 and to the lower threshold value 112 to determine if the execution load 210 violates either threshold. If the execution load 210 violates one of the thresholds at 508, at least one of the operating characteristics 114 of the processors 106 is adjusted at 510. If the execution load 210 exceeds the upper threshold value 110, one or more processors 106 and/or hardware components are enabled. If the execution load 210 is less than the lower threshold value 112, one or more processors 106 and/or hardware components are disabled. For example, adjusting the operating characteristic 114 includes, but is not limited to, enabling or disabling one or more of the following: the processors 106, ALUs, caches, vectorization units, and units for graphics or multimedia support.

If the power saving value 108 indicates a preference for responsiveness over battery life, the scheduler 202 becomes aggressive in adding processing power if the user desires a high response, and becomes slow to reduce processing power even if the execution load 210 drops. If the user indicates a preference for long battery life over responsiveness, a large overcommitment by the processors 106 occurs before the scheduler 202 adds processing power. Similarly, the scheduler 202 is quick to reduce processing power when the execution drops.

In some embodiments, the power saving value 108 (and consequently the upper threshold value 110 and the lower threshold value) is dynamically configurable based upon, for example, operating conditions of the computing device 102. For example, if the measured ambient air temperature near the processors 106 exceeds a defined value, the power saving value 108 is altered as a function of the measured temperature such that the scheduler 202 disables at least one of the processors 106 to reduce heat generation by the processors 106. For example, the room temperature may have increased, or dust may have impeded the cooling efficiencies of the computing device 102. The scheduler 202 then lowers the power saving value 108 (or reduces the power saving value 108 to a minimum value), in this example, to force the scheduler 202 to power off some or all of the hardware components. This reduces the heat generation by the processor 106 and hardware components to cool the computing device 102. The power saving value 108 is maintained at the altered level until the heat conditions have improved (e.g., ambient temperature has reduced). Generally, aspects of the invention enable the computing device 102 to run cooler by minimizing the quantity of processor hardware components powered on at any time.

Figure 6:
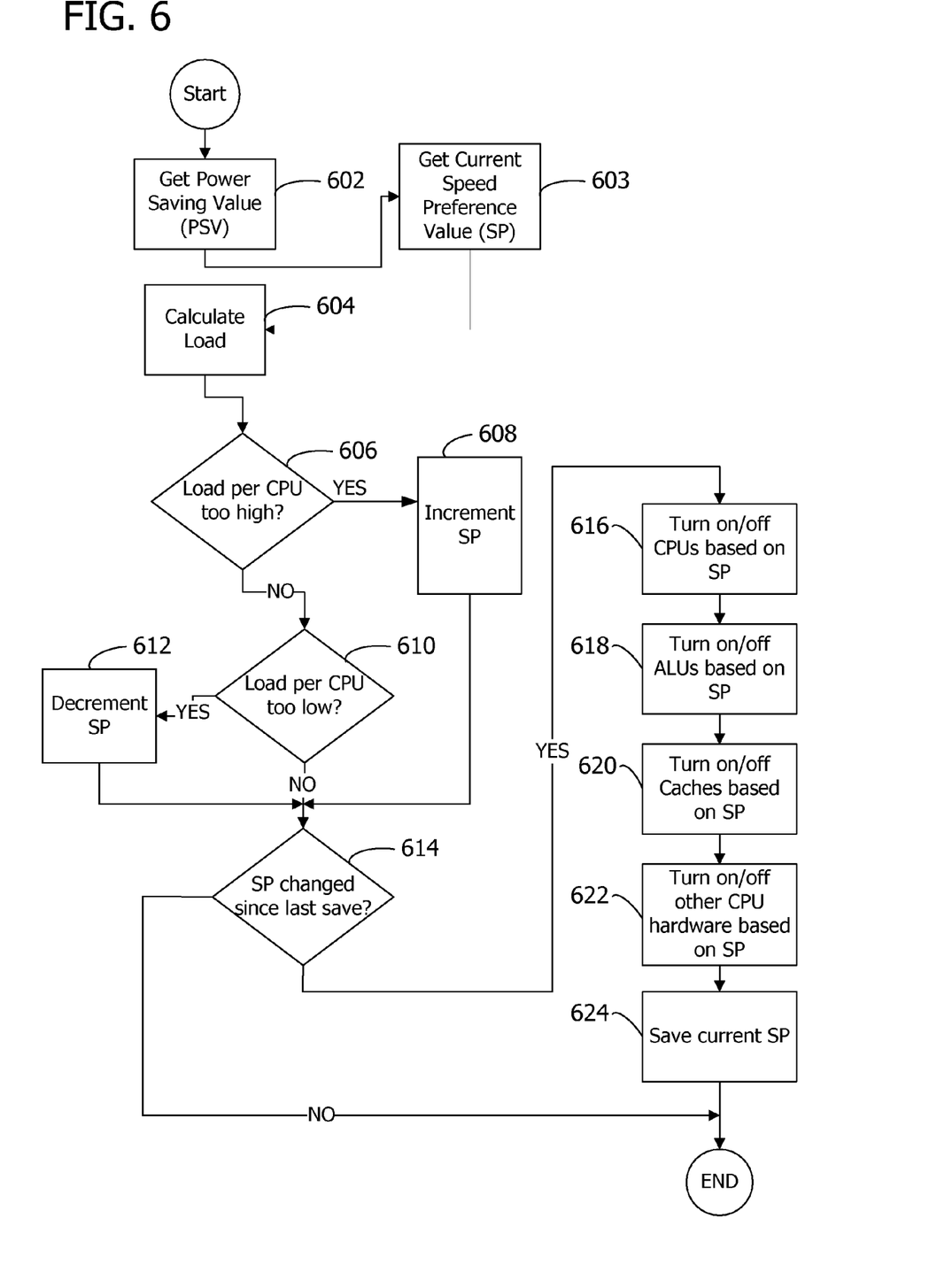
FIG. 6 is an exemplary flow chart illustrating the enabling and disabling of processor hardware based on a comparison between processor execution load and a preference input as a power saving value.
Figure 7:
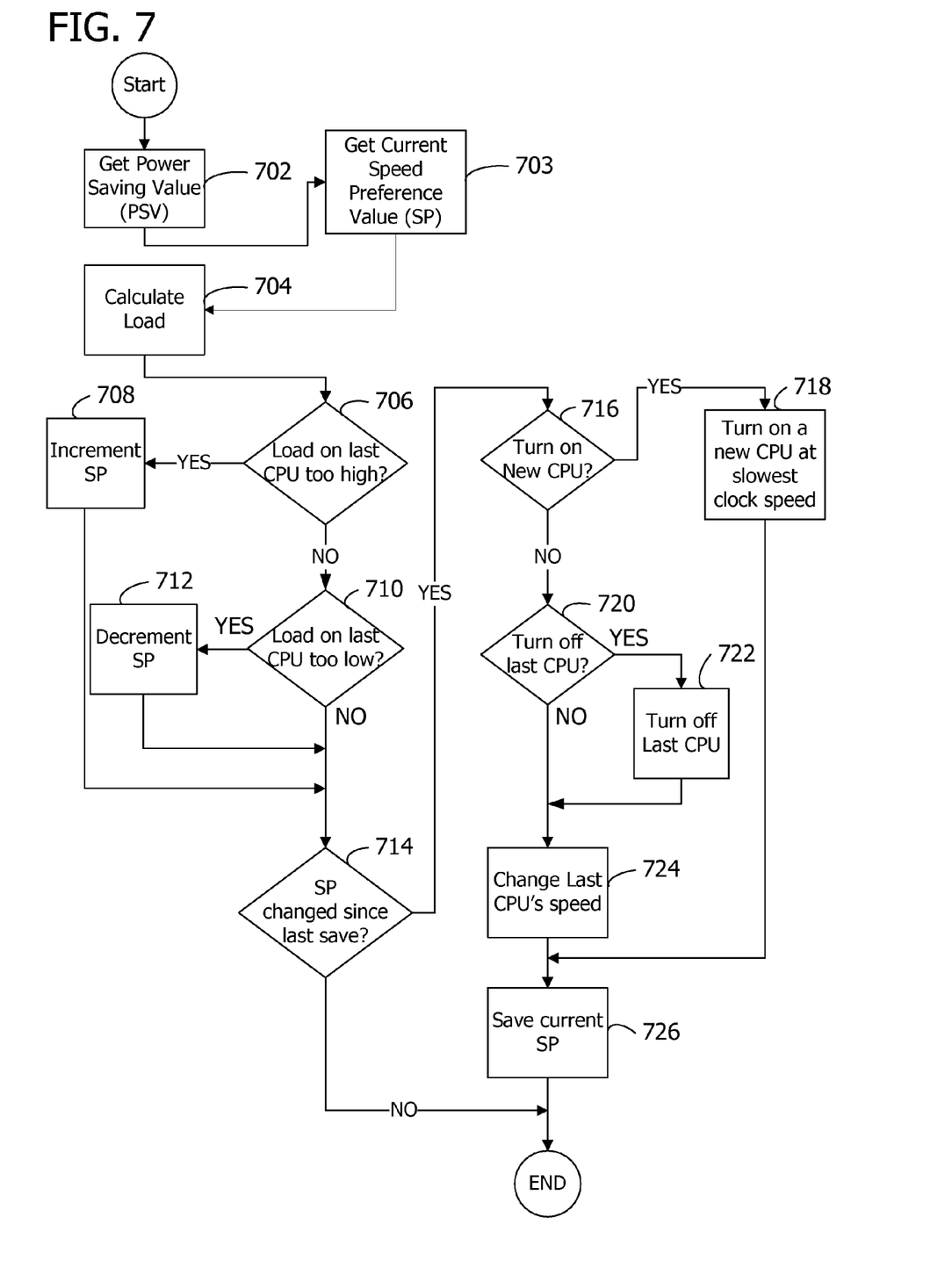
FIG. 7 is an exemplary flow chart illustrating the enabling or disabling of a processor and adjustment of processor clock frequency based on processor execution load.

Referring next to FIG. 6, an exemplary flow chart illustrates the enabling and disabling of processor hardware based on a comparison between processor execution load 210 and a preference input as the power saving value 108. In the example of FIG. 6, the scheduler 202 dynamically starts and stops processors 106 and associated processor hardware based on thread demand and cost of powering the processors 106 and associated processor hardware. The power saving value 108 or variable is obtained or otherwise accessed at 602 along with a speed preference value (SpeedPref) or variable at 603. In the example of FIG. 6 and FIG. 7, the power saving value 108 is used to calculate the boundaries that influence changes in the speed preference value. The speed preference value is used to control turning on and turning off the hardware. The execution load 210 is calculated at 604. If the execution load 210 per CPU is too high at 606, a speed preference value is incremented at 608. If the execution load 210 per CPU is too low at 610, the speed preference value is decremented at 612. If the speed preference value has changed at 614, the scheduler 202 or other logic enables or disables the CPUs at 616, ALUs at 618, caches at 620, and other hardware components at 622 based on the new speed preference value. The new speed preference value is stored at 624. In the example of FIG. 6, an increase in the power saving value 108 indicates a preference for responsiveness over battery life, while a decrease in the power saving value 108 indicates a preference for battery life over responsiveness.

In an example in which the user has an arbitrary sliding scale from 50 to 100 to control the operating characteristics 114 of the processors 106, the user selects 50 as the power saving value 108 indicating a preference for battery life over responsiveness. The scheduler 202 powers on an additional one of the processors 106 when the currently powered processors 106 are over committed by a large percentage. When the currently powered processors 106 are loaded by only a low percentage, the scheduler 202 powers down one of the processors 106. The percentage used for powering up the additional processor 106 or powering down one of the processors 106 changes based on the power draw of individual processors 106 and associated hardware for a given hardware implementation. In this example, the execution load 210 is spread across the powered processors 106 evenly by the scheduler 202.

Appendix B provides an exemplary implementation of the operations illustrated in FIG. 6.

Referring next to FIG. 7, an exemplary flow chart illustrates the enabling or disabling of one of the processors 106 and adjustment of processor clock frequency based on processor execution load 210. In the asymmetric dynamic processor clock frequency setting example of FIG. 7, the computing device 102 includes processors 106 with selectable clock frequencies and has the ability to turn each of the processors 106 on and off. The scheduler 202 fully loads each CPU from 0 to M-2, where M is the quantity of powered CPUs. CPU M-1 is then loaded with the remaining execution load. Fully loading each of the processors 106 maximizes the work output per watt consumed by each processor 106. In other embodiments, however, the processors 106 are loaded to a level that is less than the full loading based on design considerations, including responsiveness, heat generation, and power consumption. When the scheduler 202 reaches the M-1 CPU, the scheduler 202 may determine to turn that CPU off if enough load is not present to justify keeping it on, or the scheduler 202 may turn on an additional CPU if the M-1 CPU is overcommitted by a defined amount, as detailed in FIG. 7.

In addition, the scheduler 202 selects the clock frequency of the M-1 CPU to affect how much work that CPU will accomplish in a given timeframe. This allows the scheduler 202 to adjust the M-1 CPU so that it completes its load in the same time as the other CPUs. The slower clock cycle of the M-1 CPU draws less power, thus saving battery life. By only changing the frequency of the M-1 CPU, the scheduler 202 targets a closer match to the current load than if the clock frequencies of all the CPUs are changed. Further, the other CPUs remain unchanged and executing work at all times. This reduces the overhead incurred (e.g., delay) by adjusting only the clock frequency of one CPU. In this example, the scheduler 202 minimizes watt draw to partially loaded CPU by trading time for power. In single processor environments, the operations in FIG. 7 dynamically adjust the CPU frequency to the current workload while maintaining the desired battery life.

Referring again to FIG. 7, the power saving value 108 or variable is obtained or otherwise accessed at 702, along with the speed preference value or variable at 703. The execution load 210 is calculated at 704. If the execution load 210 on the last CPU is too high at 706, the speed preference value is incremented at 708. If the execution load 210 on the last CPU is too low at 710, the speed preference value is decremented at 712. If the speed preference value has changed at 714, the scheduler 202 or other logic determines at 716 whether to turn on an additional CPU at 718 at the slowest available clock frequency and determines at 720 whether to turn off the last CPU at 722. If the last CPU is turned off at 722, the clock frequency of the last of the remaining CPUs is adjusted at 724. The current speed preference value is saved at 726. In the example of FIG. 6, an increase in the power saving value 108 indicates a preference for responsiveness over battery life, while a decrease in the power saving value 108 indicates a preference for battery life over responsiveness.

Appendix C provides an exemplary implementation of the operations illustrated in FIG. 7.

In an embodiment, incrementing and decrementing the speed preference value in FIG. 6 and FIG. 7 does not exceed a defined acceptable range for the speed preference value. In other embodiments, limits are placed on the range of the speed preference value to prevent out-of-range values from being assigned.

Exemplary Operating Environment

A computer or computing device 102 such as described herein has one or more processors or processing units, system memory, and some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

The computer may operate in a networked environment using logical connections to one or more remote computers, such as a remote computer. Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein. Aspects of the invention may also be practiced in distributed computing environments where tasks are performed by remote processing devices that are linked through a communications network. In a distributed computing environment, program modules may be located in both local and remote computer storage media including memory storage devices.

The embodiments illustrated and described herein as well as embodiments not specifically described herein but within the scope of aspects of the invention constitute exemplary means for adjusting the hardware components of the processors 106 based on the power saving value 108, and exemplary means for balancing power consumption with responsiveness using the power saving value 108.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

An example implementation of the operations in FIG. 4 is next described. The example implementation uses an abstract hardware system that allows processors, ALUs, and caches to be independently turned on and off. However, the scheduler may be modified to control other hardware like the L2 cache or a vector unit in other examples (e.g., by adding additional columns to Table A1 below). The savings in this example is to reduce current leakage.

In an example in which the power saving value is 50 (e.g., slow response, great battery life), the scheduler powers off all CPUs except for one. If the currently powered CPU has a large list of threads from the scheduler, responsiveness to the user suffers but battery life is maximized.

In an example in which the power saving value is 100 (e.g., fast response, poor battery life), all available CPUs are powered and all caches and other hardware are enabled. The scheduler has multiple CPUs to which to provide the list of threads. The scheduler response time is fast, but battery life suffers.

In an example in which the power saving value is set to 75, then some quantity of available CPUs are powered while one or more other CPUs are powered off (e.g., two out of three CPUs are powered on). Further, the L1 cache is enabled, but not the L2 cache. This compromise provides a balance between power savings and user response.

Table A1 below demonstrates example outputs for the described power saving value inputs.

TABLE A1

Exemplary Outputs for Various Power Saving Values.

| Inputs Power Saving Value | Calculation Step | Outputs | | |
|---|---|---|---|---|
| | | CPUs | Cache | ALUs |
| 50 | 0 | 1 | 0 | 0 |
| 60 | 2 | 1 | 1 | 1 |
| 75 | 6 | 3 | 2 | 2 |
| 100 | 12 | 4 | 4 | 4 |

Table A2 below is used to lookup the desired outputs based on the power saving values in the example of Table A1. Because the power saving value has a range of 50 (e.g., 50 to 100) in this example and there are only twelve hardware states available in this example, a mathematical transformation is performed to enable a lookup into the table. In this example, the range adjusted value is the "step" as in Table A1 above.

$$Step = PowerSavingValue * (HardwareTableRange) / (PowerSavingValue\ Range)$$

$$Step = PowerSavingValue * 12/50$$

TABLE A2

Example Lookup Table for Hardware States.

| Step | CPU | Cache | ALU |
|---|---|---|---|
| 0 | 1 | 0 | 0 |
| 1 | 1 | 1 | 0 |
| 2 | 1 | 1 | 1 |
| 3 | 2 | 1 | 1 |
| 4 | 2 | 2 | 1 |
| 5 | 2 | 2 | 2 |
| 6 | 3 | 2 | 2 |
| 7 | 3 | 3 | 2 |
| 8 | 3 | 3 | 3 |
| 9 | 4 | 3 | 3 |
| 10 | 4 | 4 | 3 |
| 11 | 4 | 4 | 4 |
| 12 | 4 | 4 | 4 |

APPENDIX B

An example implementation of the operations in FIG. 6 is next described. The example implementation uses an abstract hardware system that allows processors, ALUs, and caches to be independently turned on and off. While the given example uses unchanging upper and lower threshold values, some hardware will exhibit a smoother response if the ranges for stepping to the next stage are calculated based on the actual increased execution speed provided by the new stage.

In this example implementation, the scheduler dynamically controls the quantity of CPU resources available. The scheduler dynamically starts and stops CPUs based on thread demand and cost of powering the CPUs. The power saving value determines how large an overcommitment prompts another CPU to power on, and how small a percentage of usage allows the scheduler to power down a CPU.

If the power saving value is set as 50, the scheduler powers on another CPU when the current CPUs are overcommitted by a large percentage. When the CPUs are only partially loaded at a low percentage, the scheduler powers down one of the CPUs. Load is spread across the powered CPUs evenly by the scheduler. The scheduler turns off a CPU responsive to a large overcommitment and quickly turns off CPUs when the load drops.

If the power saving value is set as 100, the scheduler becomes aggressive in adding additional CPU power and is slow to turn CPUs off even if the load drops in that same setting.

Table B1 below demonstrates example outputs for the described power saving value (PSV) inputs. The power saving value and the current load are used to determine if the SpeedPref variable should change based on the ability of the currently powered hardware to handle the current execution load. If the upper or lower bounds are exceeded, the SpeedPref variable is stepped up or down. The SpeedPref variable is used to directly determine the hardware powered using a lookup table.

TABLE B1

Example Hardware States Based on Input Power Saving Values (PSVs) and Current Loads.

| Inputs | | | | Outputs | | | |
|---|---|---|---|---|---|---|---|
| PSV | Current Load | Current SpeedPref | New SpeedPref | CPUs | Cache | ALUs | Description |
| 50 | 200 | 2 | 2 | 1 | 1 | 1 | no change |
| 60 | 200 | 4 | 4 | 2 | 2 | 1 | no change |
| 75 | 200 | 9 | 9 | 4 | 3 | 3 | no change |
| 100 | 200 | 12 | 12 | 4 | 4 | 4 | no change |
| 50 | 250 | 2 | 2 | 2 | 1 | 1 | don't power more hardware, save power, leave load level high |
| 60 | 250 | 4 | 5 | 2 | 2 | 2 | don't power more hardware, save power, leave load level high |
| 75 | 250 | 9 | 10 | 4 | 4 | 3 | add power, load level too high |
| 100 | 250 | 12 | 12 | 4 | 4 | 4 | upper limit reached. |
| 50 | 130 | 2 | 1 | 1 | 0 | 0 | save battery, not enough work |
| 60 | 130 | 4 | 3 | 2 | 1 | 1 | save battery, not enough work |
| 75 | 130 | 9 | 8 | 4 | 3 | 3 | load enough to keep current hardware powered |
| 100 | 130 | 12 | 12 | 4 | 4 | 4 | load enough to keep current hardware powered |

In this example, the SpeedPref variable is used to find the exact hardware to power using an example table such as Table B2 below.

TABLE B2

Example Mapping Between SpeedPref and Hardware States.

| SpeedPref (Step) | CPU | Cache | ALU |
|---|---|---|---|
| 0 | 1 | 0 | 0 |
| 1 | 1 | 1 | 0 |
| 2 | 1 | 1 | 1 |
| 3 | 2 | 1 | 1 |
| 4 | 2 | 2 | 1 |
| 5 | 2 | 2 | 2 |
| 6 | 3 | 2 | 2 |
| 7 | 3 | 3 | 2 |
| 8 | 3 | 3 | 3 |
| 9 | 4 | 3 | 3 |
| 10 | 4 | 4 | 3 |
| 11 | 4 | 4 | 4 |
| 12 | 4 | 4 | 4 |

APPENDIX C

An example implementation of the operations in FIG. 7 is next described. The example implementation uses an abstract hardware system that allows processors, ALUs, and caches to be independently turned on and off. In any given hardware implementation of the operations, the actual constants used and the lookup table are changed based on the draw of a powered CPU at the various stepping speeds available and the amount of work that can be done at a given speed for a unit of time.

The scheduler fully loads each CPU starting from zero and working toward N-1 where N is the number of powered CPUs. When the scheduler reaches CPU N-1, the scheduler may determine to turn that last CPU off if enough load is not present to justify keeping the last CPU on, or the scheduler may turn on an additional CPU if the last CPU is overcommitted by a defined amount (e.g., percentage).

Table C1 below shows how varying only the last CPU allows the CPUs to match the current workload with an over/undershoot of only 25 units versus 125 units if the CPUs share the same clock frequency.

TABLE C1

Varying Clock Frequencies of CPUs.

| Total Load | 875 |
|---|---|
| CPUs | 4 |

| MHZ | Work Done |
|---|---|
| 100 | 100 |
| 200 | 150 |
| 400 | 250 |

Best Match with all CPUs locked at same frequency

| MHZ | Load Possible | Delta |
|---|---|---|
| 100 | 400 | −475 |
| 200 | 600 | −275 |
| 400 | 1000 | 125 |

Best Match with only last CPU at variable frequency

| MHZ | 3 CPUs | Last CPU | Total Work | Delta |
|---|---|---|---|---|
| 100 | 750 | 100 | 850 | −25 |
| 200 | 750 | 150 | 900 | 25 |
| 400 | 750 | 250 | 1000 | 125 |

In this example, the power saving value and the current work load are used to determine if the last CPU (N-1) is overloaded or underloaded outside the boundaries allowed after the other CPUs (0 to N-2) are fully loaded. If the last CPU is to be adjusted, the SpeedPref step variable is changed and used to determine the new hardware state.

If additional execution capability is determined, the new hardware state is used to turn up the CPU clock frequency or turn on an additional CPU. If less execution capability is determined for the current workload and desired power savings value, the new hardware state is used to turn down the CPU clock frequency or completely power down the CPU.

Example outputs for controlling CPU hardware for several different power saving value settings and execution workload are included in the following table C2.

TABLE C2

Example Outputs Based on Power Saving Value and Current Workload.

| Inputs | | | | Last CPU current | Outputs | | Last | |
|---|---|---|---|---|---|---|---|---|
| PSV | Current Load | Current SpeedPref | CPUs on | speed (MHz) | New SpeedPref | CPUs | CPU Speed | Description |
| 50 | 200 | 2 | 1 | 200 | 2 | 1 | 200 | no change |
| 60 | 200 | 4 | 2 | 100 | 4 | 2 | 400 | no change |
| 75 | 200 | 9 | 3 | 400 | 8 | 3 | 200 | Slowdown last CPU |
| 100 | 200 | 12 | 4 | 400 | 11 | 4 | 200 | Slowdown last CPU |
| 50 | 300 | 2 | 1 | 200 | 3 | 1 | 400 | speed up last CPU |
| 60 | 300 | 4 | 2 | 100 | 3 | 2 | 100 | no change |
| 75 | 300 | 9 | 3 | 400 | 8 | 3 | 200 | Slow down last CPU |
| 100 | 300 | 12 | 4 | 400 | 11 | 4 | 200 | Slow down last CPU |
| 50 | 400 | 2 | 1 | 200 | 3 | 1 | 400 | speedup last CPU |
| 60 | 400 | 4 | 2 | 100 | 4 | 2 | 100 | no change |
| 75 | 400 | 9 | 3 | 400 | 9 | 3 | 200 | no change |
| 100 | 400 | 12 | 4 | 400 | 11 | 4 | 200 | Slow down last CPU |

The power saving value is used to index into a table such as Table C3 below.

TABLE C3

Exemplary Lookup Table.

| SpeedPref | CPU | Speed |
|---|---|---|
| 0 | 1 | 100 MHZ |
| 1 | 1 | 100 MHZ |
| 2 | 1 | 200 MHZ |
| 3 | 1 | 400 MHZ |
| 4 | 2 | 100 MHZ |
| 5 | 2 | 200 MHZ |
| 6 | 2 | 400 MHZ |
| 7 | 3 | 100 MHZ |
| 8 | 3 | 200 MHZ |
| 9 | 3 | 400 MHZ |
| 10 | 4 | 100 MHZ |
| 11 | 4 | 200 MHZ |
| 12 | 4 | 400 MHZ |

What is claimed is:

1. A system for balancing power consumption with responsiveness for one or more processors on a mobile computing device, said system comprising:

a memory area for storing a power saving value, said power saving value representing a graduated preference relating to responsiveness of the processors versus power consumption of the processors, said processors having one or more hardware components associated therewith, said memory area further storing a defined correspondence between one or more of the hardware components and power consumption factors, each of said power consumption factors representing a power cost associated with use of the corresponding hardware component; and a processor programmed to:

access the power saving value stored in the memory area;

select one or more of the power consumption factors based on the accessed power saving value to identify one or more of the hardware components to adjust; and adjust the identified hardware components corresponding to the selected one or more power consumption factors to manage the power consumption of the processors.

2. The system of claim 1, wherein the processor is further programmed to detect a change in the power saving value, and wherein the processor identifies the one or more power consumption factors and adjusts the hardware components responsive to the detected change.

3. The system of claim 1, further comprising means for adjusting the hardware components of the processors based on the power saving value.

4. The system of claim 1, further comprising means for balancing power consumption with responsiveness using the power saving value.

5. A method comprising:

defining a correspondence between one or more hardware components and power consumption factors, each of said power consumption factors representing a power cost associated with use of the corresponding hardware component, said hardware components being associated with one or more processors;

accessing an upper threshold value and a lower threshold value, said upper threshold value and said lower threshold value being associated with at least one computing device, said computing device having the one or more processors associated therewith, said upper threshold value and said lower threshold value representing a preference relating to responsiveness of the processors versus power consumption of the processors;

determining an execution load on the processors, wherein the determined execution load is distributed substantially equally among the processors;

comparing the determined execution load to the upper threshold value and to the lower threshold value;

selecting one or more of the power consumption factors based on the defined correspondence and the upper threshold value and the lower threshold value to identify one or more of the hardware components to adjust; and adjusting the identified hardware components based on said comparison and said selected one or more power consumption factors.

6. The method of claim 5, further comprising:

accessing a power saving value, said power saving value representing a graduated preference relating to responsiveness of the processors versus power consumption of the processors; and determining the upper threshold value and the lower threshold value based on the accessed power saving value.

7. The method of claim 6, wherein accessing the power saving value comprises one or more of the following: receiving the power saving value from a user, and accessing the power saving value set by an original equipment manufacturer of the processors.

8. The method of claim 5, wherein the upper threshold value comprises one or more of the following: a degree of overcommitment by the processors, a defined maximum power draw by the processors, and a defined maximum execution load for the processors.

9. The method of claim 5, wherein the lower threshold value comprises one or more of the following: a degree of undercommitment by the processors, a defined minimum power draw by the processors, and a defined minimum execution load for the processors.

10. The method of claim 5, wherein adjusting the identified hardware components comprises one or more of the following: enabling an additional processor, disabling one of the processors, enabling an arithmetic logic unit associated with the processors, disabling an arithmetic logic unit associated with the processors, enabling a cache associated with the processors, disabling a cache associated with the processors, enabling a vectorization unit, disabling a vectorization unit, enabling specialized units for graphics or multimedia support, and disabling specialized units for graphics or multimedia support.

11. The method of claim 5, wherein adjusting the identified hardware components comprises enabling another processor if said comparing indicates that the processors are overcommitted.

12. The method of claim 5, wherein adjusting the identified hardware components comprises disabling one of the processors if said comparing indicates that the processors are underutilized.

13. The method of claim 5, wherein determining the execution load on the processors comprises measuring demand for thread execution for each of the processors.

14. The method of claim 5, further comprising:

measuring an ambient air temperature near the processors; and altering the upper threshold value as a function of the measured temperature such that at least one of the processors becomes disabled to reduce heat generation by the processors.

15. One or more computer storage media embodying computer-executable modules for balancing power consumption of a plurality of processors with responsiveness of the processors, said modules comprising:

a memory module for accessing an upper threshold value and a lower threshold value, said upper threshold value and said lower threshold value being associated with at least one computing device, said computing device having a plurality of processors associated therewith, said upper threshold value and said lower threshold value representing a preference relating to responsiveness of the processors versus power consumption of the processors, said memory module further storing a defined correspondence between one or more hardware components of the processors and power consumption factors, each of said power consumption factors representing a power cost associated with use of the corresponding hardware component;

a scheduler module for distributing an execution load among the plurality of processors such that all but one of the processors is fully loaded, said one of the processors representing a partially loaded processor;

a thread module for determining the partial load on the partially loaded processor;

an analysis module for comparing the determined partial load to the accessed upper threshold value and to the accessed lower threshold value, said analysis module further selecting one or more of the power consumption factors based on the defined correspondence and the upper threshold value and the lower threshold value to identify one or more of the hardware components to adjust; and a controller module for adjusting the identified hardware components of the partially loaded processor based on said comparison and said selected one or more power consumption factors.

16. The computer storage media of claim 15, wherein the controller module adjusts the identified hardware components by adjusting a clock frequency of the partially loaded processor such that the partially loaded processor provides responsiveness substantially equivalent to responsiveness of the other processors.

17. The computer storage media of claim 16, wherein the clock frequency of the partially loaded processor differs from a clock frequency of the other processors.

18. The computer storage media of claim 15, wherein the controller module adjusts the identified hardware components of the partially loaded processor by:

disabling the partially loaded processor; and distributing the partial load among the other processors.

19. The computer storage media of claim 15, wherein the thread module determines the partial load by measuring a quantity of active threads assigned to execute on the partially loaded processor.

20. The computer storage media of claim 15, wherein the controller module adjusts one or more of the following hardware components associated with the partially loaded processor: an arithmetic logic unit, a cache, a vectorization unit, and a unit for graphics or multimedia support.

* * * * *